United States Patent [19]

Goettler

[11] 4,376,144

[45] Mar. 8, 1983

[54] TREATED FIBERS AND BONDED COMPOSITES OF CELLULOSE FIBERS IN VINYL CHLORIDE POLYMER CHARACTERIZED BY AN ISOCYANATE BONDING AGENT

[75] Inventor: Lloyd A. Goettler, Akron, Ohio

[73] Assignee: Monsanto Company, St. Louis, Mo.

[21] Appl. No.: 252,111

[22] Filed: Apr. 8, 1981

[51] Int. Cl.$^3$ .................. B29D 3/02; B29D 23/04; B32B 1/08; F16L 11/10
[52] U.S. Cl. ................................. 428/36; 138/125; 138/174; 264/108; 264/209.1; 428/48; 428/292; 428/295; 428/302; 428/326; 428/338; 428/339; 428/361; 524/14; 524/35
[58] Field of Search ............... 260/17.4 CL; 428/295, 428/297, 302, 361, 326, 48, 36, 338, 339; 138/125, 174; 524/35, 14

[56] References Cited

U.S. PATENT DOCUMENTS

| | | | |
|---|---|---|---|
| 2,550,143 | 4/1951 | Eger | 260/17.2 |
| 3,697,364 | 10/1972 | Boustany et al. | 161/59 |
| 3,836,412 | 9/1974 | Boustany et al. | 156/62.2 |
| 3,943,079 | 3/1976 | Hamed | 260/17.4 CL |
| 4,056,591 | 11/1977 | Goettler et al. | 264/108 |
| 4,057,610 | 11/1977 | Goettler et al. | 264/108 |
| 4,248,743 | 2/1981 | Goettler | 524/13 |
| 4,263,184 | 4/1981 | Leo | 260/17.4 CL |

FOREIGN PATENT DOCUMENTS 1166876 10/1969 United Kingdom .

Primary Examiner—James C. Cannon
Attorney, Agent, or Firm—Gordon B. Seward

[57] ABSTRACT

Cellulose fibers are treated with vinyl chloride polymer, a plasticizer and an isocyanate bonding agent. Composites are made from cellulose fibers dispersed in a matrix of plasticized vinyl chloride polymer, and bonded thereto with an isocyanate bonding agent. The composites can be molded or extruded to produce useful articles.

23 Claims, No Drawings

TREATED FIBERS AND BONDED COMPOSITES OF CELLULOSE FIBERS IN VINYL CHLORIDE POLYMER CHARACTERIZED BY AN ISOCYANATE BONDING AGENT

BACKGROUND OF THE INVENTION

This invention relates to composites of cellulose fibers dispersed in a matrix of vinyl chloride polymer, and to treated cellulose fibers which have improved dispersability into vinyl chloride polymer and improved adhesion thereto.

It is well known to incorporate discontinuous fibers into an organic polymer matrix to form composite materials having improved properties. For example, Boustany et al. U.S. Pat. No. 3,697,364 describes composites of this type in which the contained fibers are oriented so as to give considerable strength and stiffness to the composites in the direction of fiber orientation.

It is also known that the dispersion of discontinuous cellulose fibers into a polymeric matrix can be greatly facilitated by pretreatment of the fibers with a plastic polymer and a lubricant. U.S. Pat. No. 3,943,079 to Hamed describes such a pretreatment.

SUMMARY OF THE INVENTION

It has now been found that the adhesion of discontinuous cellulose fibers to a matrix of vinyl chloride polymer can be substantially improved by incorporating therewith a certain bonding agent. It has also been found that discontinuous cellulose fibers, when treated to reduce fiber-to-fiber interaction, possess improved adhesion when incorporated into a matrix of vinyl chloride polymer if the treatment includes a small amount of a certain bonding agent.

According to the present invention, composites are made of discontinuous cellulose fibers dispersed in a vinyl chloride polymer matrix which includes a bonding agent which is a cyclic trimer of toluene diisocyanate. Composites containing from 1 to 40% of cellulose fibers by weight, based on the total weight of the composite, are within the scope of the invention. The bonding agent is thought to have the following structural formula:

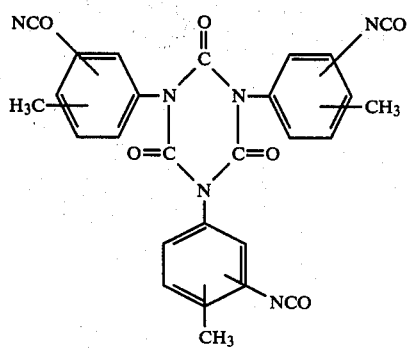

The bonding agent has been found to be effective at relatively low concentrations—as low as 0.1 parts by weight on 100 parts by weight of the vinyl chloride polymer in the matrix. The matrix will often contain a plasticizer for the vinyl chloride polymer, in amounts which can range from about one part by weight up to 100 parts by weight per 100 parts by weight of the vinyl chloride polymer.

The invention also includes treated fibers which are discontinuous cellulose fibers, usually with an aspect ratio greater than 20, coated with vinyl chloride polymer, a plasticizer for the polymer, and a minor amount of a cyclic trimer of toluene diisocyanate. The latter material appears not only to improve the adhesion of the fibers to a vinyl chloride polymer matrix, but also to improve the dispersability of the treated fibers into the matrix material.

DESCRIPTION OF THE PREFERRED EMBODIMENTS

Cellulose is a carbohydrate polymer of glucose residue units. It can be either regenerated or unregenerated (natural) cellulose. Rayon is regenerated cellulose. Examples of natural cellulose fibers include seed fibers such as cotton, woody fibers represented by coniferous and deciduous woods, bast fibers represented by flax, leaf fibers such as sisal, and fruit fibers such as coconut. However, wood fibers, either hardwood or softwood, are preferred. Especially preferred is hardwood kraft, made by the sulfite process. The fibers have an aspect ratio (length divided by average diameter) greater than 20.

Preferably, the fibers comprise those having aspect ratios within the range of 20-350, with a more preferred range of 50-350, and an even more preferred range of 75-200. In some instances, it is desirable to use mixtures of fibers having widely differing aspect ratios. The improved dispersability of the fibers of the invention is important in that excessive mixing, which tends to increase fiber breakage, can be avoided. The final aspect ratio of the fibers strongly affects the modulus attained in the composites. Further, reduced mixing times are favorable to process economy. In some instances, untreated fibers will never give good dispersions, regardless of the mixing time.

The polymer contained in the matrix is described as being "vinyl chloride polymer" and includes both vinyl chloride homopolymer and copolymer of a major proportion of vinyl chloride with a minor proportion of other copolymerizable monomers such as vinyl acetate or vinylidene chloride.

The plasticizer which can be contained in the matrix should be one which is compatible with the vinyl chloride polymer as described. An incompatible plasticizer can be used if the composite contains enough of a primary or compatibilizing plasticizer. For a discussion of plasticizers, see *Encyclopedia of Polymer Science and Technology*, Vol. 10, p. 128 et seq (J. R. Darby, author) John Wiley & Sons, Inc., New York, 1969. Examples of effective plasticizers include adipates, such as di-2-ethylhexyl adipate and diisodecyl adipate; azelates, such as di-2-ethylhexyl azelate; benzoates, such as dipropylene glycol dibenzoate; phosphates, such as tricresyl phosphate, cresyl diphenyl phosphate, 2-ethylhexyl diphenyl phosphate, di-n-octyl phenyl phosphate, and tri-n-hexyl phosphate; phthalates, such as diethyl phthalate, butyl benzyl phthalate, di-2-ethylhexyl phthalate, and diisodecyl phthalate; sebacates, such as di-2-ethylhexyl sebacate and terephthalates, such as di-2-ethylhexyl terephthalate. A compatible blend of two or more plasticizers can be used. In use, the plasticizer has the effect not only of softening and modifying the polymer, but also of lubricating the fiber surfaces, promoting dispersion and minimizing fiber breakage.

The fibers are described as "discontinuous," to distinguish from the well known incorporation of continuous cord reinforcement into rubber and plastic articles. The "matrix" is the material forming a continuous phase which surrounds the fibers. A "composite" is the combination of discontinuous fibers in a matrix wherein the contained fibers may be randomly oriented, or, to a greater or lesser degree, aligned in a particular direction. Composites in which the fibers are highly aligned, as taught in U.S. Pat. No. 3,697,364, mentioned above, are particularly useful, in calendered or extruded objects.

The bonding agent of the invention is a cyclic polymer of toluene diisocyanate. The preferred form of the bonding agent is the isocyanurate trimer, represented by the structural formula:

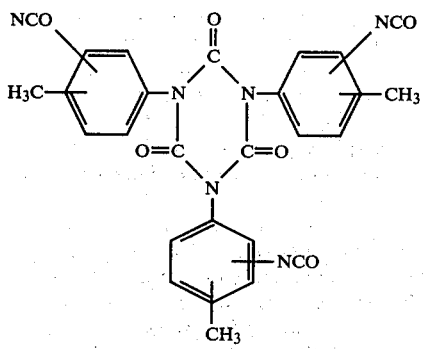

The bonding agent is used in the composites of the invention in sufficient amount to achieve an adhesive bond between the vinyl chloride polymer and the cellulose fibers. This amount can be as little as 0.1 parts by weight per 100 parts by weight of the vinyl chloride polymer, up to 5 parts by weight or more, on the same basis. Obviously, little is gained by using a large excess of bonding agent over that which gives the desired result: improved adhesion between the polymer and the fibers, with consequent improved properties in the finished composite. The amount of bonding agent required can also be expected to vary with the amount of cellulose fiber present.

The mechanism of the bonding is not known, however, it is hypothesized that the active isocyanate moieties in the bonding agent react with the hydroxyl groups on the cellulose fibers, forming a chemical bond therewith.

The bonding agent can be used in solution in a convenient, compatible, non-reactive solvent, in order to facilitate dispersion of the active material throughout the composite. More preferably, the isocyanate trimer can be used in solution in a plasticizer for the vinyl chloride polymer. A commercially available material is described as being an approximately 25% solution by weight of the isocyanurate polymer of toluene diisocyanate in dibutyl phthalate. This material is sold by Vulnax International, Ltd., under the product name "Vulcabond VP," and recommended for use in adhering nylon and polyester textile materials to poly(vinylchloride) plastisols.

The bonding agent can also contain other isocyanate compounds, such as toluene diisocyanates, or polymeric forms such as polymethylene polyphenylisocyanate (sold under the trademark PAPI®), and a material having the following structural formula:

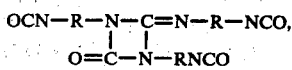

where R is

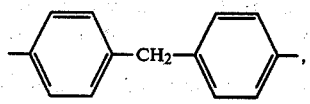

although the cyclic trimer is the preferred material. Mixtures of one or more of the other isocyanate materials can be present along with the cyclic trimer, but their effect is inferior thereto in the present invention.

The bonding agent can be incorporated into the composites of the invention by mixing the bonding agent therewith, at the same time the fibers are combined with the vinyl chloride polymer, plasticizer, and other ingredients. If the bonding agent is added in solvent solution, the solvent will usually be removed prior to the final shaping of the compound. Of course, if a plasticizer solution form of bonding agent is employed, this step is unnecessary.

Alternatively, it has been found advantageous to combine the bonding agent with the cellulose fibers in a pre-treating step. Following the teachings of Hamed U.S. Pat. No. 3,943,079, the fibers can be treated so as to enhance their dispersability into a composite by admixture thereto of organic polymer which can be processed as a thermoplastic substance, in an amount sufficient to reduce fiber-to-fiber affinity, and lubricant adsorbable to the fiber surface and enhancing both the receptiveness of the fiber to the organic polymer and the separation of individual fibers. Preferably, the organic polymer is vinyl chloride polymer, although other compatible polymer can be used. Also preferably, the lubricant is a plasticizer for the organic polymer. As explained above, the bonding agent can also be added in solution in plasticizer, and this is very effectively done when it is desired to incorporate the bonding agent into the treated fibers.

An unexpected beneficial result is noted in that the treated fibers which contain the bonding agent show a noticeable improvement in their dispersability into a polymeric matrix over fibers merely treated with polymer and lubricant alone.

The effectiveness of the bonding agent of the invention is surprising, since it would not be expected that an adhesive which was designed for use with nylon or polyester textiles could be so especially effective in adhering discontinuous cellulose fibers to a vinyl chloride polymer matrix.

The effect of obtaining a strong adhesive bond between the cellulose fibers and the surrounding matrix is, of course, to provide a composite which has maximum strength and stiffness. In use, stresses applied to the matrix material are transferred, through the adhesive bonds, to the fibers, which have a considerably higher strength and modulus of elasticity than the matrix. With optimum bonding, achieved in many instances, the adhesive bond is stronger than the fibers themselves, so the fibers will actually rupture before they are pulled out of the matrix.

As stated above, the techniques of U.S. Pat. No. 3,943,079 can be used to produce the treated fibers of the invention. An internal mixer, such as a Banbury mixer is advantageously used, and the materials, vinyl chloride polymer, fiber, plasticizer, bonding agent, and other ingredients, can all be charged initially. The order of addition of materials to the mixer is not critical, however, and other charging schedules can be used if desired.

The temperature of mixing should be sufficiently high at some point during the mixing cycle to flux the vinyl chloride polymer, and produce a homogeneous mixture with the plasticizer. Usually, about 120° C. is sufficient to accomplish this result because of the high plasticizer content of the mixture. Higher temperatures can be used, but excessive heat can be harmful over a period of time, so the recommended temperature at which the polymer is fluxed should not be exceeded for any great length of time. Usually, it will be economically advantageous to mix as rapidly as possible, and to avoid excessively high temperatures.

Again, the time of mixing will usually be minimized, and will, of course, depend on a number of factors, such as the type of mixer, the degree of shear obtained, the proportions of the ingredients, and the size and temperature of the batch.

The proportions of the ingredients will usually be dictated by the properties described in the treated fibers. Generally, the ratio of fibers to the other ingredients will be as high as possible in order to maximize production of the treated fibers. Usually, the desired form of the treated fibers is as springy, spongy clusters of fiber, lightly held together. If the fiber ratio is too low, the product may be a mass of fibers aggregated together, and if the ratio is too high, the fibers may be insufficiently coated.

The amount of polymer used will be at least sufficient to prevent fiber-to-fiber interaction, usually at least 2 parts of vinyl chloride polymer by weight per 100 parts by weight of cellulose fibers. Generally, no more than 50 parts of vinyl chloride polymer by weight per 100 parts of fibers by weight will be used, although higher polymer levels can be employed if desired. The level of plasticizer used will normally range from about 5 parts up to as much as 150 parts or more plasticizer by weight per 100 parts by weight of fiber. When a particulate form of treated fiber is desired, as described above, the upper limits of polymer and plasticizer will typically be somewhat less than the amounts set forth above. Given the wide variety of formulations which can be used effectively within the scope of the invention, the optimum ratios of polymer and plasticizer to fiber can be readily determined by experimentation.

As indicated above, the preferred level of the bonding agent in the composites of the invention is from 0.1 to 5 parts per 100 parts of vinyl chloride polymer by weight. In the treated fibers themselves, which will be incorporated into composites, it is preferred that all of the bonding agent be present. As shown by experimental results, the treated fibers disperse better into the matrix when they contain the bonding agent. In most instances, it will be most convenient to include all of the bonding agent in the treated fibers, anyway, since no further additions of this ingredient need be added in making the final composite. Since the treatment step coats the surfaces of the fibers to a certain extent, the polymer present in the coating will be in a position to be bonded to the fibers.

Cellulose fibers normally contain equilibrium amounts of water at ambient atmosphere, often in an amount of up to ten percent. In view of the usual sensitivity of isocyanate compounds to even a trace of water, it is surprising that cellulose fibers treated with a coating containing the bonding agents of the invention show no change in their excellent bonding properties, even after four months shelf aging.

The treated fibers of the invention preferably contain higher levels of bonding agent than the composites, since, as explained above, it is preferred that all of the bonding agent required in the final composite be present in the coating on the fibers. Thus, the treated fibers will preferably contain from about 0.1 to about 10 parts by weight of bonding agent, based on 100 parts by weight of the cellulose fibers. If high levels of treated fiber are to be incorporated into the final composite, the amount of bonding agent in the final composite will tend to be higher. Conversely, if a low treated fiber level is used, the final composite will contain a lower, though adequate, level of bonding agent. It appears that some bonding of the fiber to the PVC polymer in the coating is achieved during the fiber treating process, giving adequate bonding in the final composite despite a relatively low level of bonding agent, calculated as parts per 100 parts of vinyl chloride polymer.

The composites of the invention are usually, though not necessarily, made from the bonded treated fibers of the invention. If desired, composites can be prepared within the scope of the invention by combining vinyl chloride polymer, bonding agent and optionally additional plasticizers, fillers and other ingredients with cellulose fibers other than those of the present invention. These other fibers can be treated as described in U.S. Pat. No. 3,943,079, or they can even be untreated fibers, incorporated as shown in Goettler U.S. Pat. No. 4,248,743. In any case, however, the bonding agent of the present invention must be present in the recommended amount in order to achieve good adhesive bonding between the cellulose fibers and the matrix.

Admixture of treated fibers to form a composite is usually performed in an internal mixer, such as a Banbury mixer, or on a roll mill. The Brabender mixer is particularly effective for this purpose in the laboratory. Additional ingredients, such as fillers, colorants, stabilizers and additional plasticizer can also be added at this point. Recommended fillers include clay, talc, alumina, wollastonite, and calcium carbonate, with talc and calcium carbonate preferred. If desired, the fibers can then be oriented in the final composite, by passing a sheet of the composite through a hot roll mill. Several passes are often used in order to optimize orientation of the fibers in the direction of passage through the rolls. This is followed by compression molding of the sheet to produce a desired article. Alternatively, the composite can be extruded to align the fibers axially. If a hose or tube shaped product is desired, axial orientation of fibers can be produced therein, or by using the techniques set forth in U.S. Pat. Nos. 4,056,591 and 4,057,610, in a direction other than axial. Injection molding techniques can be used, as well, in shaping the composites.

The composites of the invention can also take the form of floor tile materials, containing, for example, 35 parts of plasticizer, 600 parts of calcium carbonate filler, and 15 parts of treated cellulose fiber (including 0.2 phf bonding agent) per 100 parts of vinyl chloride polymer, all by weight. After mixing, the composite is sheeted out to about 4 mm thickness, and shows excellent properties as a floor tile. The use of the treated cellulose fibers of the invention as a replacement for asbestos fibers in floor tile is highly advantageous where asbestos use is undesirable, for health and environmental reasons.

A better understanding of the invention can be obtained by reference to the following specific examples, in which all parts are by weight unless otherwise indicated.

EXAMPLE I

In order to compare the effect of various bonding agents in a composite formulation, a series of compounds was prepared containing the bonding agent of the invention, as well as several other isocyanate-based adhesives and controls. A 25% solution of a cyclic trimer of toluene diisocyanate in dibutylphthalate, sold under the name "Vulcabond VP" was used as the preferred bonding agent. Also included for comparison were a medium viscosity linear polymethylene polyphenylisocyanate of the formula:

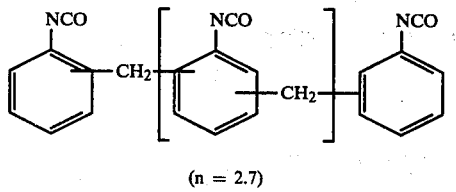

(n = 2.7)

identified as PAPI®; a similar material having the same general formula but a lower viscosity because of its 50% content of 4,4'-diphenylmethane diisocyanate and 50% higher molecular weight polymer, identified as PAPI®-27; and a material identified as Isonate® 143L which is 80% 4,4'-diphenylmethane diisocyanate and 20% of an adduct of the formula:

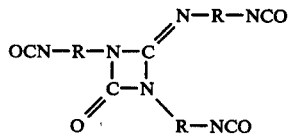

where R is

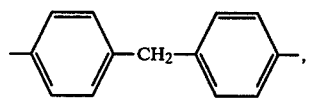

The matrix compound contained approximately 64% vinyl chloride polymer, 32% plasticizer, the remainder being stabilizers and colorants.

The fibers used were treated as described in U.S. Pat. No. 3,943,079 and had the following formulation:

| Material | Parts by Weight |
|---|---|
| Hardwood Pulp | 100 |
| Plasticizer (butyl benzyl phthalate) | 40 |
| Vinyl Chloride Polymer (Geon 110 × 334) | 10 |
| | 150 |

Composites were prepared as set forth in Table I, following.

TABLE I

| | SAMPLES | | | | | | | | | | | |
|---|---|---|---|---|---|---|---|---|---|---|---|---|
| | A | B | C | D | E | F | G | H | I | J | K | L |
| Matrix Compound | 65.0 | 65.0 | 65.0 | 45.5 | 45.5 | 45.5 | 45.5 | 45.5 | 45.5 | 45.5 | 45.5 | 45.5 |
| Treated Fiber | | | | 19.5 | 19.5 | 19.5 | 19.5 | 19.5 | 19.5 | 19.5 | 19.5 | 19.5 |
| Geon 110 × 334 | | 2.43 | | | 1.7 | | | | | | | |
| Vulcabond VP | | 2.14 | 2.14 | | 1.5 | 1.5 | | | | | | |
| PAPI | | | | | | | | .17 | .38 | | | |
| PAPI-27 | | | | | | | | | | .17 | .38 | |
| Isonate 143L | | | | | | | | | | | .19 | .38 |

Samples A, B, and C contained no fibers. Samples B and C contained 5.0 parts Vulcabond VP, or 1.25 parts of the cyclic trimer of toluene diisocyanate per 100 parts of vinyl chloride polymer, by weight, with Sample B containing additional vinyl chloride polymer to compensate partially for the plasticizer in the Vulcabond VP. All the remaining samples contained 20 weight percent cellulose fiber, and a plasticizer level of 65 parts per 100 parts of vinyl chloride polymer, by weight. Sample E contained a compensating amount of vinyl chloride polymer, in the same manner as Sample B, above. The amounts of the comparative adhesives in Samples G, I, and K are molar equivalents to the amount of active cyclic trimer in Samples E and F. For further comparison, Samples H, J, and L contained equal weights of the comparative adhesives, resulting in higher —NCO levels in Samples H, J, and L than in Samples E and F.

Mixing was done in a bench-top Brabender mixer equipped with cam type mixing blades. The temperature of the oil circulating to the mixer was 162° C. The samples were mixed for 4 minutes at 100 rpm rotor speed. The melt temperature at dump varied from 160° to 168° for the batches containing fiber.

While still hot, the Brabender discharge was sheeted out between even speed mill rolls at 105° C. Mill nip was about 2.5 mm. In each case, the sample was passed and folded five times to produce a high degree of fiber directionality parallel to the machine direction. Square samples cut from the sheets were molded in a picture frame mold in contact with 168° C. platens for 4 minutes before cooling.

Type D-1708 micro tensile specimens were later die-cut from this sheet parallel to the principal fiber direction, which was determined by propagating a tear through the sample. Tensile testing was done at room temperature and the following rates:

57.1%/minute for fiber composites
1,140%/minute for the unreinforced samples (A, B, C)

A uniform failure time of about 20 seconds obtained for all samples.

In samples B, C, E, and F, the Vulcabond VP bonding agent was added to the molten composite after one minute of mix time had transpired. However, in order to get a more accurate weight of the smaller amounts of the isocyanate systems and to prevent splatter due to their low viscosity, the bonding agents of batches G, H, I, J, K, and L were added to the PVC hose compound prior to fluxing. This difference in procedure is not believed to have any influence on the degree of bonding obtained.

The data in Table II show that the bonding agent of the invention produces an unexpectedly high degree of bonding in comparison to the other isocyanate adhesives. This result is substantiated by photomicrographs of the fractive surfaces.

TABLE II

| Sample | Wt. % Cellulose Fiber | Plasticizer, Parts per 100 of Polymer | 0° TENSILE PROPERTIES | | | | | |
|---|---|---|---|---|---|---|---|---|
| | | | Young's Mod., MPa | Yield Strength, MPa | Ultimate Strength, MPa | Yield Elongation, % | Ultimate Elongation, % | Tensile Strength, % of E |
| A | 0 | 50 | 10.7 (0.5) | | 15.8 (0.3) | | 375 (0) | |
| B | ↓ | ↓ | 10.2 (0.1) | | 15.7 (0.2) | | 375 (30) | |
| C | ↓ | ↓ | 10.2 (0.5) | | 15.5 (0.3) | | 340 (10) | |
| D | 20 | 65 | 80 (1.4) | 8.3 (0.3) | 7.8 (0.1) | 15.7 (1.3) | 25.3 (5.1) | 51. |
| E | ↓ | ↓ | 116 (6) | | 16.3 (0.5) | | 19.6 (.9) | 100. |
| F | ↓ | ↓ | 101 (12) | | 15.1 (0.9) | | 20.0 (2.7) | 93. |
| G | ↓ | ↓ | 116 (9.0) | | 13.5 (0.5) | | 14.9 (0) | 83. |
| H | ↓ | ↓ | 118 (1.0) | | 14.8 (0.3) | | 16.2 (.7) | 91. |
| I | ↓ | ↓ | 123 (7) | | 14.0 (0.5) | | 15.1 (.3) | 86. |
| J | ↓ | ↓ | 125 (3) | | 15.0 (0.3) | | 14.9 (0) | 92. |
| K | ↓ | ↓ | 118 (3) | | 12.6 (0.2) | | 14.3 (.6) | 77. |
| L | ↓ | ↓ | 126 (6) | | 13.3 (0.9) | | 13.1 (1.0) | 82. |

Number in parenthesis is sample standard deviation.

Tensile data are presented in Table II. The effect of the higher extensional rate on the unreinforced samples typically results in an increase in the modulus of about 37%, but a decrease in the strength by about 7%. All of the matrix (unreinforced) samples have about the same modulus, but compensation for the plasticizer in the Vulcabond VP with additional Geon PVC resin appears to be necessary to maintain the ultimate tensile properties. The standard deviation figures indicate good reproducibility of the data.

The addition of fiber causes a sharp increase in the Young's Modulus but bonding is required to gain tensile strength. The highest tensile strength is recorded with Vulcabond VP in Stock E, where the plasticizing effect of the Vulcabond vehicle is properly compensated by the additional PVC resin. The softening effect of uncompensated plasticizer vehicle from the Vulcabond VP in Stock F reduces the strength by 1.2 MPa or 7%.

Although the 16.3 MPa strength of Sample E exceeds the unreinforced sample strength by only 3%, much strength is compromised by the additional plasticizer on the treated fiber. If the comparison were made against an unreinforced compound containing the 65 parts plasticizer of the composites instead of the 50 part level of the unreinforced samples, our experiments show that the reinforcement would instead be on the order of 21%.

None of the isocyanates studied produced as good a bonding between the cellulose fiber and the PVC resin as the Vulcabond VP. Percentage comparisons are given in Table II. On the average, the doubling of —NCO content in Stocks H, J, and L raised tensile strength by 1.0 MPa or 8%, but the mean of these is still 12% below the strength of Stock E. Of the isocyanates, PAPI-27 was the most active, and Isonate 143L the least.

A larger proportion of loose fiber ends are visible in those samples in which tensile strength was reduced by poor bonding of the fibers to the matrix.

EXAMPLE II

To evaluate the effect of including the bonding agent in the fiber treating materials, a comparison was run in which fibers thus treated were incorporated into composites which were compared with composites made as in Example I (with the bonding agent added in the final step of combining treated fibers with matrix material).

A series of five samples was prepared, all of which were composites containing 19 weight percent cellulose fibers based on the total composite weight and 61.6 parts by weight plasticizer per 100 parts of vinyl chloride polymer. The matrix compound used was the same as in Example I. Again, using the fiber-treating methods of U.S. Pat. No. 3,943,079, two different batches of treated fibers were prepared, according to the following formulation:

| Material | Treated Fiber A Parts by Weight | Treated Fiber B Parts by Weight |
|---|---|---|
| Hardwood Pulp | 100 | 100 |
| Plasticizer (butyl benzyl phthalate) | 30 | 30 |
| Vinyl Chloride Polymer (Geon 110 × 334) | 5 | 5 |
| Paragon Clay | 30 | 30 |
| Vulcabond VP | 0 | 0.83 |
| | 165 | 165.83 |

The treated fiber samples were prepared by charging all ingredients into a BR Banbury mixer, and mixing for 4 minutes at 77 rpm rotor speed. Batch temperatures did not exceed 110° C.

Composite samples were prepared as shown in Table III, following, in which all parts are by weight.

TABLE III

| | SAMPLES | | | | |
|---|---|---|---|---|---|
| | M | N | O | P | Q |
| Matrix Compound | 44.6 | 44.6 | 44.6 | 44.6 | 44.6 |
| Treated Fiber A | 20.3 | — | 20.3 | 21.1 | — |
| Treated Fiber B | — | 20.4 | — | — | 21.2 |
| Vulcabond VP | — | — | 0.1 | 1.16 | 1.16 |
| Geon 110 × 334 | — | — | — | 1.41 | 1.41 |

Sample M was a control, containing no bonding agent. Sample N was made with fibers treated with the bonding agent included. Sample O was made with unbonded fibers, with the bonding agent added to the final composite at the same level as in Sample N (0.35 parts per 100 parts of vinyl chloride polymer, by weight). Sample P was also made with unbonded fibers, but with the bonding agent added to the final composite at the level of 4.1 parts per 100 parts of vinyl chloride polymer, by weight. Sample Q was made with the fiber containing bonding agent, and an additional amount of 4.1 parts of bonding agent added to the final composite.

Final composites were prepared in a Brabender mixer equipped with cam type blades at 162° C. for 4 minutes using a rotor speed of 100 rpm. The Vulcabond VP when used was added to the melt after the first minute of mixing had transpired.

Samples were sheeted out in five passes through an even-speed roll mill at 105° C. to orient the fibers. Tensile coupons (ASTM D-1708) were cut from molded sheets parallel to the fiber direction and pulled in an Instron tester at room temperature at a rate of 57.1%/min.

Dispersion in the final composite was measured by slicing strips with a sharp blade and counting the exposed clumps per unit area.

Test results are set forth in Table IV, following.

TABLE IV

| Sample | Young's Modulus, MPa | Ultimate Strength, MPa | Ultimate Elongation, % | Clump Density, Clumps/m² |
|---|---|---|---|---|
| M | 134 | 11.8 | 11.6 | 7900 |
| | (13.8) | (0.3) | (.9) | |
| N | 133 | 13.9 | 13.8 | 1500 |
| | (6.2) | (0.3) | (1.4) | |
| O | 134 | 12.7 | 13.1 | 4800 |
| | (8.3) | (0.6) | (.6) | |
| P | 146 | 15.0 | 14.1 | 7900 |
| | (16.5) | (1.3) | (1.2) | |
| Q | 123 | 14.3 | 15.8 | 0 |
| | (4) | (1.2) | (2.4) | |

(Standard deviation in parentheses)

The tensile test results in Table IV indicate that bonded fibers (Sample N) give very good adhesion, and, even at a relatively low level (0.35 parts per 100 polymer), the bonding agent produces the same tensile strength and modulus as Samples P and Q, containing a considerably higher level of bonding agent added to the composite. Also, the better ultimate strength of Sample N than Sample O indicates some interaction of the bonding agent on the treated fiber. The dispersion data show that the composites (N, Q) made with bonded fibers have much better dispersion of the fibers than those made with unbonded fibers.

The composites were mixed and tested four months after the preparation of the fibers, indicating that the residual moisture in the cellulose pulp is no impediment to a strong bond.

Although the foregoing invention has been described in some detail by way of illustration and example for purposes of clarity of understanding, it will be obvious that certain changes and modifications may be practiced within the scope of the appended claims.

The embodiments of the invention in which an exclusive property or privilege is claimed are defined as follows:

1. A composite of discontinuous cellulose fibers dispersed in a matrix comprising plasticized vinyl chloride polymer wherein the fibers are bonded to the matrix with a cyclic trimer of toluene diisocyanate.

2. The composite of claim 1, wherein from 0.1 to 5 parts by weight of bonding agent is present, based on 100 parts of the vinyl chloride polymer by weight.

3. The composite of claim 1, wherein the cellulose fibers comprise from 1 to 40 weight percent of the total weight of the composite.

4. The composite of claim 1, wherein a plasticizer for the vinyl chloride polymer is present in an amount of from about one to 100 parts by weight, based on 100 parts of the vinyl chloride polymer by weight.

5. The composite of claim 1, wherein the bonding agent has the structural formula:

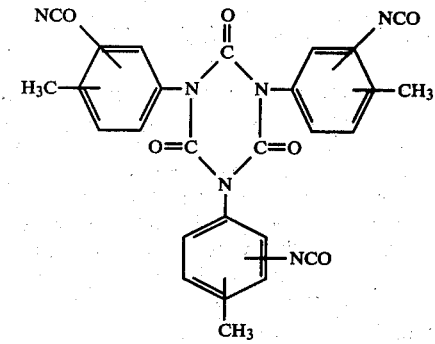

6. The composite of claim 1, wherein the fibers have an aspect ratio of at least 20.

7. The composite of claim 1, wherein the fibers are hardwood pulp.

8. The composite of claim 1, wherein the vinyl chloride polymer is a copolymer from a monomer mixture comprising at least fifty weight percent vinyl chloride.

9. The composite of claim 1, wherein the matrix contains a particulate filler.

10. The composite of claim 1, wherein the fibers are oriented predominantly in one direction.

11. The composite of claim 1, which contains talc.

12. A treated fiber comprising discontinuous cellulose fiber, vinyl chloride polymer, a plasticizer for said polymer, and a bonding agent comprising a cyclic trimer of toluene diisocyanate.

13. The treated fiber of claim 12, which contains a filler.

14. The treated fiber of claim 12, wherein the cellulose fiber has an aspect ratio greater than 20.

15. The treated fiber of claim 14 wherein the aspect ratio is from 50 to 350.

16. The treated fiber of claim 15 wherein the aspect ratio is from 75 to 200.

17. The treated fiber of claim 12, wherein the bonding agent is present in an amount of from 0.1 to 10 parts by weight, based on 100 parts of the fiber by weight.

18. The treated fiber of claim 12, wherein the vinyl chloride polymer is present in an amount of from 5 to 100 parts by weight, based on 100 parts of the fiber by weight.

19. The treated fiber of claim 18, wherein the vinyl chloride polymer is present in an amount of from 2 to 50 parts by weight, based on 100 parts of the fiber by weight.

20. The treated fiber of claim 13, wherein the plasticizer is present in an amount of from 5 to 150 parts by weight, based on 100 parts of the fiber by weight.

21. A hose made from the composite of claim 1.

22. An injection molding made from the composite of claim 1.

23. Floor tile made from the composite of claim 1.

* * * * *